3,062,760
METHOD OF PRODUCING A MICROPOROUS POLYMERIC RESIN
William F. Dermody, Titusville, N.J., and Theodore H. Meltzer, Levittown, Pa., assignors to The Electric Storage Battery Company, a corporation of New Jersey
No Drawing. Filed Oct. 6, 1959, Ser. No. 844,640
1 Claim. (Cl. 260—2.5)

The invention relates to the production of microporous materials, and, more particularly, to the production of microporous materials from those organic polymers which, heretofore, it has been difficult or impossible to process into such end products.

Organic polymeric materials containing a plurality of pores that are microscopic or even submicroscopic in size are useful when fabricated into a number of end products. These end products can vary widely, as for example, those used in consumer products such as raincoats, heavyweather clothing, tents, tarpaulins and the like, where the quality of microporosity permits breathing and yet imparts the quality of water repellency to the product. Such materials are also valuable when used as separators in electric batteries in which the micropores permit ionic transfer, but yet inhibit the transfer of metallic particles between the plates.

Exemplary of the techniques by which these materials have heretofore been produced is U.S. Patent No. 2,542,527, Honey and Hardy, issued on February 20, 1951, and assigned to the assignee of the present invention. Disclosed in this patent is the method of producing microporous materials which comprises the incorporation of pore forming agent into a powdered mix of polyvinyl chloride and a plasticizer, the pore forming agent being incompatible either with the resin or with the plasticizer. The mix is then sheeted or otherwise formed, as by extrusion, and the pore forming agent removed therefrom leaving a plurality of pores, or micropores, depending on the original size of the pore forming agent. Although eminently suitable for the production of microporous materials to a certain extent, this process is subject to several inherent disadvantages. It is adaptable only to a limited number of synthetic resins, primarily polystyrene and polyvinyl chloride, and can be used only with polymers that are blendable with pore forming substances under the influences of heat or plasticizers without detriment to the desired properties of the finished material. This of course, prohibits the use of such polymers as phenol formaldehydes, furans, polyesters, polyurethanes, or any other polymers which are dependent on an in situ chemical reaction to develop desired properties after forming or shaping into a desired geometric configuration. Furthermore, the use of a plasticizer, i.e., a temporary solvent that must be driven off before the end product can be produced, is costly and hazardous to health if the solvent fumes escape to the atmosphere. On the other hand, it is an extensive and expensive undertaking to provide a closed system, in which the solvent can be removed and reused.

Accordingly, it is an object of the invention to provide a method of producing microporous material of an organic polymer base that will permit the processing of those organic polymers that have heretofore not been adaptable to such type of end products.

It is a further object of the invention to provide a method of producing microporous materials that is capable of practice in the absence of the plasticizers or temporary solvents heretofore imblended with all the disadvantages thereof.

It is the basis of the present invention to utilize the monomeric or prepolymeric form of an organic polymer either as the sole raw material from which the microporous material is to be produced or as the solvent or suspension vehicle for the polymeric form of the same resin or of a different resin that is soluable or dispersable therein.

To carry out the invention in its general terms, a monomer or mixture of monomers or prepolymers in liquid form such as, for example, styrene, methyl methacrylate, phenol formaldehyde, furfural alcohol, epoxy, are blended with a pore forming agent such as, for example, starch, calcium carbonate, sodium chloride, sodium bicarbonate, sodium sulfate or sugar to produce a paste, slurry or suspension of such a viscosity as will permit it to be formed by any suitable means into a definite shape or to be deposited as a coating or film that may be supported by a backing of another substance. Thereafter, the resin is polymerized as by heat, light, radiation, chemical catalyst or by any other known technique applicable to the specific resin used. The polymerized resin is then treated with a leaching agent such as water, acid, enzyme solution or any other desirable agent that will remove the pore forming material from the polymerized resin leaving a porous or microporous material that can be used as hereinbefore described.

Specific examples of the production of microporous resins in accordance with the above set forth techniques are as follows, all proportions being given by weight unless otherwise specified:

*Example 1*

We mix 100 parts by weight of ground limestone (pore forming material) with 43 parts by weight of styrene catalyzed with 1% lauryl peroxide. The mixing process is carried out at a temperature of about 75° F. and continued for a period of 10 minutes. This technique produces a monomer pore former mixture of such viscosity that it can be extruded. The extruded shape was then treated by heating for a period of about 200 minutes to polymerize the styrene (monomer) thereby producing polystyrene. The limestone was removed from the polymerized resin by immersing the resin in a bath of 10% hydrochloric acid maintained at a temperature of about 140° F. for a period of 24 hours. This process resulted in a resin having a microporosity in the nature of 40%.

*Example 2*

To 100 parts of a one-stage phenol formaldehyde resin we add 125 parts potato starch and 0.5 to 5.0 parts of hexamethylene tetramine as a catalyst, both of which are stirred in at a temperature in the neighborhood of 20° C. The resultant paste or dough is formed, and the resin is caused to react to an insoluble product by heating in a mold, autoclave or oven to a temperature of above 100° C. The starch is then removed from the reacted product by simultaneous gelation and hydrolysis with aqueous 5% hydrochloric acid at 100° C.

The porosity of the resultant product is of the order of 60% by volume.

*Example 3*

To 100 parts furfural we add 1 part by weight of lead acetate as a catalyst and heat to 100° C. until the solution becomes viscous. We add 200 parts granular sodium chloride and continue heating during the incorporation of the salt. When the salt is thoroughly mixed into the resin, we increase the temperature to 140–150° C. for several minutes to produce a stiff dough which we shape as desired and then react the resin to an insoluble product at temperatures in the range 140–150° C. The salt is then removed by elution with boiling water at a temperature of 100° C.

*Example 4*

To 100 parts of polyester resin syrup prepared by condensation of a polyol, such as glycerol, with a polyacid, such as phthalic anhydride, we add 150 parts tapioca starch and one part benzoyl peroxide as a catalyst, form the resultant mass and hold it at 90° C. until it becomes rubbery, then increase the temperature to 125° C. to produce an infusible product. We then swell the starch in boiling water, cool the product rapidly to 60° C. and remove the starch by hydrolysis with an enzyme, after which the product may be further hardened by heating to 170° C. if this is desired.

*Example 5*

To 100 parts of liquid epoxy resin, such as Araldite CN503, which is an unmodified epoxy resin made from bisphenol "A" and epichlorlydrine and has an average molecular weight of about 400, we add 10 parts of a catalyst such as triethylene tetramine and 250 parts magnesium sulfate (epsom salt) and mix the salt in thoroughly. We form and react the resin at room temperature, or for thin sections, at temperatures up to 80° C. until it is converted to a hard, infusible product. The salt is then dissolved and eluted with warm water to obtain a porous product.

*Example 6*

To 100 parts of liquid polyalkylene polysulfide, such as Thiokol LP32, we add 1 part stearic acid, and 0.1 part sulfur and mix thoroughly by passing 3 times through a paint mill. To the resulting mixture we add 11.4 parts of a mixture consisting of lead peroxide 10 parts, stearic acid 1 part, and dibutyl phthalate 9 parts which has been thoroughly blended on a paint mill or a ball mill. We then add 150 parts sodium sulfate which is stirred in until thoroughly incorporated. The mixture is formed and allowed to set to a rubbery mass in 1 to 2 days at room temperature or heated to a temperature of 155° C. for 15 minutes for faster reaction. The salt is then dissolved and eluted with warm water to obtain an elastic porous product.

*Example 7*

In a stirred kettle we heat 1000 grams of polytetramethylene ether glycol-toluene diisocyanate polymer (Du Pont Adiprene L) until the temperature of the liquid reaches 100° C., continue stirring and slowly add 1000 grams of previously dried potato starch and, when thoroughly mixed in and free from lumps, add with continued stirring, 45 grams of a mixture of polyols consisting of 1,4-butanediol (tetramethylene glycol), 7 parts, and trimethylol propane, 2 parts, degas under vacuum if necessary to remove bubbles, form and cure 6 hours at 140° C. in dry air. Remove the starch by digesting in 5% hydrochloric acid at 100° C. for 15 minutes for thin film, longer for greater thickness, followed by a water rinse.

As has been stated above, the monomeric or pre-polymeric form of the resin can be used both as the raw material and as the solvent either for the polymeric form of the same resin or a different resin. This technique is substantially similar to the technique described above with the exception that the viscosity of the mixture prior to polymerization is governed by the combination of monomer-polymer-pore former. It should be noted in connection with this phase of the invention, that there can be produced products from the combination of a monomer of one resin and a polymer of another resin that will consist of a copolymer or a graft-polymer combining the properties of the two resins that are utilized. Specific examples are set forth as follows:

*Example 1*

We dissolve about 15 parts of polyvinyl chloride and 1 part lauryl peroxide in about 100 parts of styrene monomer and add to this mixture about 200 parts of a pore forming agent such as fine granulated sugar. The mixture was then formed into a body by extrusion and thermally treated at a temperature of 80° C. for a period of 6 hours whereby a co-polymer of polystyrene and polyvinyl chloride was produced. The pore forming agent was leached therefrom by treating in a bath of water maintained at a temperature of 100° C. for about 45 minutes. The co-polymer thus produced had a microporosity of about 60%.

*Example 2*

We dissolve about 5 parts natural rubber, 1 part benzoyl peroxide and 30 parts polystyrene in 100 parts of styrene monomer and add 150 parts of potato starch. When the mixture is thoroughly blended, we form it into shapes as desired and polymerize the styrene by heating overnight at a temperature of 60° C. We swell the starch in boiling water and hydrolize in 30 minutes at 95–100° C. in an aqueous solution of 2% sulfuric acid, rinse and dry to give a porous product.

*Example 3*

To about 100 parts polyester resin syrup we add 1 part benzoyl peroxide. We separately wet 250 parts of fine precipitated whiting with 500 parts of styrene monomer containing 0.5 part cobalt naphthenate. We add the resultant paste to the resin syrup and mix thoroughly. We form the mixture and then evaporate essentially all of the styrene monomer to concentrate the solids and increase the potential porosity of the product. We then co-polymerize the resin and the residual styrene at about 125° C. to yield a completely solvent-free product. We then remove the whiting by digestion with 10% hydrochloric acid at 90–100° C.

*Example 4*

We mix 100 parts epoxy resin, such as Epon 828, 50 parts polysulfide rubber, such as Thiokol LP3, and 10 parts diethylene triamine and add 250 parts potato starch and cure overnight at room temperature or 10–15 minutes at 80° C. We swell the starch in boiling water and remove it by enymatic hydrolysis at 60° C.

In the above general description and in each of the specific examples given, it will be noted that we have completely eliminated the difficulties attendant upon the use of a separate solvent and the recovery thereof in accordance with prior art methods. By the utilization of synthetic resin monomers essentially the entire matrix of the mix is converted to the polymeric form without the concurrent production of by-products of waste material. By suitable selection of the starting monomers or prepolymers, the resultant porous material may be either a linear or cross linked polymer, rigid or flexible, plastic or elastic.

We claim:

A method of producing a microporous material comprising the steps of incorporating into a liquid by intimate mixing powdered polymer and inert finely divided solid pore forming agent insoluble in said liquid, said liquid being selected from the group consisting of styrene, methyl methacrylate, phenol formaldehyde, furfural and polyalkylene polysulfide, said solid pore forming agent being selected from the group consisting of calcium carbonate, starch, sodium chloride, Epsom salts, and sodium sulfide, heating said liquid to produce a shapable mass, shaping said mass, heating said shaped mass to produce a solid mass and leaching said solid pore forming agent from said solid mass in a solvent in which said solid mass is insoluble and said pore forming agent is soluble.

References Cited in the file of this patent

UNITED STATES PATENTS

| | | |
|---|---|---|
| 2,175,798 | Hauser | Oct. 10, 1939 |
| 2,505,353 | Fisk | Apr. 25, 1950 |
| 2,542,527 | Honey et al. | Feb. 20, 1951 |
| 2,922,768 | Mino et al. | Jan. 26, 1960 |

FOREIGN PATENTS

| | | |
|---|---|---|
| 733,093 | Great Britain | July 6, 1955 |